US010057864B2

(12) United States Patent
Su et al.

(10) Patent No.: US 10,057,864 B2
(45) Date of Patent: Aug. 21, 2018

(54) METHOD AND APPARATUS FOR COMMON OBSERVATION RECEIVER FOR TRANSMITTER AND RECEIVER

(71) Applicant: TELEFONAKTIEBOLAGET LM ERICSSON (PUBL), Stockholm (SE)

(72) Inventors: Youping Su, Täby (SE); Ming Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 117 days.

(21) Appl. No.: 15/105,242

(22) PCT Filed: Dec. 20, 2013

(86) PCT No.: PCT/CN2013/090152

§ 371 (c)(1),
(2) Date: Jun. 16, 2016

(87) PCT Pub. No.: WO2015/089845

PCT Pub. Date: Jun. 25, 2015

(65) Prior Publication Data

US 2017/0006561 A1 Jan. 5, 2017

(51) Int. Cl.
*H04W 52/52* (2009.01)
*H04B 1/525* (2015.01)
(Continued)

(52) U.S. Cl.
CPC .......... *H04W 52/52* (2013.01); *H04B 1/3805* (2013.01); *H04B 1/401* (2013.01);
(Continued)

(58) Field of Classification Search
CPC ........ H04B 1/3805; H04B 1/401; H04B 1/50; H04B 1/525; H04B 1/54; H04L 5/14; H04W 52/52
See application file for complete search history.

(56) References Cited

U.S. PATENT DOCUMENTS 5,889,814 A * 3/1999 Simmons .................. H04L 5/14 370/252
6,130,897 A * 10/2000 Ishida .................... H04B 1/005 370/276
(Continued)

FOREIGN PATENT DOCUMENTS

CN 101300741 A 11/2008
CN 103039012 A 4/2013
(Continued)

*Primary Examiner* — Andrew C Oh

(57) ABSTRACT

In a method in a common observation receiver of a transceiver, a Transmitter Radio Frequency, TXRF, signal spectrum is received, a Receiver Radio Frequency, RXRF, signal spectrum is further received. Furthermore, a switching scheme is determined based on whether the type of the transmitter and the receiver is Frequency Division Duplex, FDD, or Time Division Duplex, TDD. Based on the switching scheme, the TXRF signal spectrum and the RXRF signal spectrum are switched into a switched baseband signal spectrum. By arranging a common observation receiver in a radio transceiver, and observing radio frequency signal spectrums, the transceiver may acquire knowledge about nonlinearities and other irregularities of applied components.

20 Claims, 7 Drawing Sheets

300
302
308
TX low level block
DAC
PA
FU
306
Common OR Module
ADC
Baseband
310a
310
RX Block
ADC
RF LNA Block
304

(51) Int. Cl.

| | |
|---|---|
| ***H04L 5/14*** | (2006.01) |
| ***H04B 1/3805*** | (2015.01) |
| ***H04B 1/401*** | (2015.01) |
| *H04B 1/50* | (2006.01) |
| *H04B 1/54* | (2006.01) |

(52) U.S. Cl.

CPC ............... *H04B 1/525* (2013.01); *H04L 5/14* (2013.01); *H04B 1/50* (2013.01); *H04B 1/54* (2013.01)

(56) References Cited

U.S. PATENT DOCUMENTS 6,434,509 B1 * 8/2002 Tsuchiya ............... G01S 5/0063 702/157
8,374,282 B2 * 2/2013 Szopko ..................... H03F 1/30 375/289
2002/0176375 A1 * 11/2002 Barabash ................. H04B 1/52 370/277
2007/0165745 A1 * 7/2007 Fonden ................. H03F 1/3247 375/297
2008/0219275 A1 * 9/2008 Boariu .................. H04W 8/005 370/401
2009/0111398 A1 * 4/2009 Leukkunen ........... H04L 27/364 455/114.2
2009/0163154 A1 * 6/2009 Fonden ................. H03F 1/0288 455/114.2
2010/0008446 A1 * 1/2010 Netsell .................. H04L 27/368 375/296
2010/0202325 A1 * 8/2010 Poulin .................... H04B 1/006 370/280
2010/0297966 A1 11/2010 Row et al.
2010/0302976 A1 * 12/2010 Tikka ...................... H04B 1/04 370/278
2012/0052822 A1 * 3/2012 Monroe ............... H04B 1/0071 455/90.2
2012/0236923 A1 * 9/2012 Xu ..................... H04B 17/0007 375/232
2012/0281777 A1 11/2012 Ho et al.
2013/0176913 A1 * 7/2013 Niskanen ................ H04B 1/48 370/278
2014/0016525 A1 * 1/2014 Yoshizawa .............. H04Q 1/50 370/294
2014/0177685 A1 * 6/2014 Balijapalli .......... H04L 27/3809 375/219
2014/0241225 A1 * 8/2014 Novak .................. H04W 72/02 370/311
2014/0286205 A1 * 9/2014 Ghaboosi ................ H04L 5/001 370/280
2015/0043390 A1 * 2/2015 Wang .................... H04W 24/02 370/280
2015/0304096 A1 * 10/2015 Sahlin .................. H04B 7/2615 370/280
2016/0020817 A1 * 1/2016 Chen ...................... H04B 17/12 370/278
2016/0278117 A1 * 9/2016 Sahlin .................. H04B 7/2615

FOREIGN PATENT DOCUMENTS

WO 2007063184 A1 6/2007
WO 2009056672 A1 5/2009
WO 2013039634 A2 3/2013

* cited by examiner

METHOD AND APPARATUS FOR COMMON OBSERVATION RECEIVER FOR TRANSMITTER AND RECEIVER

This application is a 371 of International Application No. PCT/CN2013/090152, filed Dec. 20, 2013, the disclosure of which is fully incorporated herein by reference.

TECHNICAL FIELD

The present disclosure relates to radio transmitters and receivers in communication networks, especially it relates to observation receivers in transceiver arrangements in radio communication apparatuses.

BACKGROUND

In wireless communication networks, UEs (User Equipments), communicate data via radio base stations.

When communicating data, DL (Downlink) data is sent from radio base stations to UEs, and UL (Uplink) data is sent from UEs to radio base stations. To enable the radio base stations and the UEs to exchange UL data and DL data between each other, they both comprise transceiver arrangements and antennas.

In this description, the term “User Equipment” will be used to denote any suitable communication terminal adapted to communicate with a radio base station. A UE may be implemented as a mobile phone, a PDA (Personal Digital Assistant), a handheld computer, a laptop computer, etc. A “radio base station” may be implemented as a NodeB, an eNodeB, a repeater, etc.

With reference to FIG. 1, which is a schematic block diagram, a communication scenario will now be described according to the prior art.

In a RAN (Radio Access Network) 100, a UE 102 is present to exchange data with a core network 108 via a radio base station 104, e.g. a NodeB. Transceivers of as well the UE 102 and the radio base station 104 comprise transmitter parts and receiver parts. Some examples of transceiver arrangements will be further disclosed below.

In order to enable transceivers to compensate for irregularities of included components, especially non-linearity of power amplifiers, commonly specific transmitter observation receivers (TORs) have been arranged in the transceivers. These TORs analyses the TXRF (Transmitter Radio Frequency) signal spectrum and provides feedback to the transmitters of the transceiver.

Receivers of transceivers are typically implemented as homodyne receivers or heterodyne transceivers.

In “homodyne” receiver, a received RF signal spectrum is directly frequency converted to zero frequency or near to zero frequency range. By mixing the received RF signal spectrum with a local oscillator output frequency which is identical to, or very close to the carrier frequency of the intended signal spectrum. The frequency converted signal spectrum is then applied to a demodulator which gives baseband signals out, before being A/D (Analogue-to-Digital) converted and fed into the receiver arrangement. By performing only a single frequency conversion, the basic circuit complexity is reduced but other issues arise, for instance, regarding dynamic range, and against blocking performance.

In “heterodyne” receiver structures, an incoming RF-signal is fed into a mixer where it is mixed with a local oscillator (LO) frequency. The mixer output is a down-converted version of the RF-signal of an intermediate frequency, i.e. the RF-signal spectrum is transferred into an IF (Intermediate Frequency) spectrum.

Also RXRF (Receiver Radio Frequency) signal spectrums may be observed and analysed in order to achieve an increased performance of the receiver. However, the major task is to enable the receiver to compensate for noise and interference, which is e.g. introduced by nonlinear circuits, such as amplifiers and mixers which receive the RXRF signal spectrums. Some basic of an ROR (Receiver observation receiver) is that it should be more linear than the receivers themselves.

With reference to FIG. 2, which is a schematic overview, a transceiver according to the prior art will now be described.

The transceiver 200 is a TDD (Time Division Duplex) transceiver and comprises a transmitter 202, a receiver 204, an antenna port 206, and a baseband unit 208. The transmitter 202 is arranged to convert a TX (Transmitter) baseband of the baseband unit 208 into an RXRF signal spectrum. In the transmitter 202, the baseband is subject e.g. to digital-to-analog conversion (DAC), frequency shifting, and amplifying (PA), which result in a RXRF signal spectrum. The antenna port 206 is arranged to transmit the RXRF signal spectrum via an antenna. At the antenna port 206, the RXRF signal spectrum is filtered in a band-pass filter of a filter unit (FU). A TOR (Transmitter Observation Receiver) 210 is further arranged to frequency shifting the RXRF signal spectrum, before analog-to digital converting (ADC) the frequency shifted RXRF signal spectrum and input to the baseband unit 208. The baseband unit 208 will then get feedback regarding the characteristics of the transmitter 202 and its various components. For instance, the baseband unit 208 may be aware of non-linearities of the PA, and may for instance introduce or adjust DPD (Digital Pre-Distortion) of the baseband signal spectrum before being fed to the input of the transmitter 208.

The receiver 204 is arranged to convert an RXRF signal spectrum which is received from the antenna via the antenna port 206 and convert into an RX baseband signal spectrum. The receiver 204 comprises an LNA (Low Noise Amplifier) and an RX block. The power of the RXRF signal spectrum is low and due to large gain of the LNA the amplified RXRF signal spectrum is typically affected substantial amount of noise. A ROR (Receiver Observation Receiver) 212 is further arranged in parallel with an RX block of the receiver 204, to enable the baseband unit 208 to get feedback regarding the characteristics of the components of the receiver 204. For instance, the baseband unit 208 may be aware of various gains of the RF LNA block and the RX block, as well as the current interference situation.

The basic concept of as well the TOR and the ROR is that they comprise local oscillators and A/D-converters arranged to mix the TXRF and RXRF spectrums, respectively. TORs have been traditionally been used, but the need for RORs is quite new. In addition, the requirements of TORs and RORs are quite different. For TORs, the input power, i.e. the power of TXRF is high and the dynamic range is low. For RORs, on the other hand, the power of the RXRF is low and the dynamic range is high. One problem is also that the local oscillators of the TOR and the ROR may disturb each other. Especially, the LO of the ROR is sensitive to disturbances from the LO of the TOR.

As stated, this example relates to a TDD transceiver. However, the situation for an FDD (Frequency Division Duplex) transceiver is similar. One difference is however, that the RXRF signal spectrum and the TXRF signal spectrum have different carrier frequencies. Therefore, the filtering unit (FU) of an FDD transceiver comprises one further band-pass filter, and the LO (Local Oscillator) output frequencies of the TOR 210 and the ROR 212 differ.

In general, components of transmitters and receivers, such as power amplifiers, etc. are expensive to manufacture within reasonable tolerances. Typically, characteristics of power amplifiers are not linear for large gains. In order to compensate for non-linearities and other non-ideal characteristics, transmitters are therefore often provided with so called Transmitter Observation Receivers, which monitors the TXRF (Transmitter Radio Frequency) signal spectrum of the transmitter.

In homodyne transceivers arrangements, also the RXRF (Receiver Radio Frequency) signal spectrum of the receiver are observed, especially for enabling the transceiver to compensate for a large dynamic range of input power.

There is a need to achieve an efficient and flexible solution to control transceivers.

SUMMARY

It would be desirable to obtain improved performance in radio transceivers. It is an object of this disclosure to address at least any of the issues outlined above.

Further, it is an object to provide a mechanism for observation of transmitters and receivers. These objects may be met by a method and an arrangement according to the attached independent claims.

According to one aspect a method performed by an observation receiver for enabling observation of a transmitter and a receiver is provided. The method comprises receiving a Transmitter Radio Frequency, TXRF, signal spectrum and a Receiver Radio Frequency, RXRF, signal spectrum. Furthermore, the method comprises to determining a switching scheme based on whether the type of the transmitter and the receiver is Frequency Division Duplex, FDD, or Time Division Duplex, TDD, and switching, based on the switching scheme, the TXRF signal spectrum and the RXRF signal spectrum into a switched baseband signal spectrum.

Furthermore, the switching may comprise alternatingly selecting one of the TXRF signal spectrum and the RXRF signal spectrum, and mixing the selected one of the TXRF signal spectrum and the RXRF spectrum with a local oscillator, LO, output signal, resulting in a switched Intermediate Frequency, IF, signal spectrum. The switching may further comprise analog-to-digital converting the switched IF signal spectrum into the switched baseband signal spectrum. The method may further comprise various filtering, and gain adjustments, due to the observed radio frequency signal spectrums.

Moreover, the method may be applied to both FDD transceivers and TDD transceivers.

According to another aspect, an observation receiver which is capable to conduct the above describe method is also provided.

Furthermore, a communication network node, such as any appropriate radio base station, may comprise the above described observation receiver. Correspondingly, a UE may comprise the above described observation receiver.

By arranging a common observation receiver in a radio transceiver, and observing radio frequency signal spectrums, the transceiver may acquire knowledge about nonlinearities and other irregularities of applied components. The transceiver may then be able to compensate for these irregularities. Furthermore, the common observation receiver may not be limited to any specific radio access technology. For instance, the common observation receiver may be applied in GSM, UMTS, LTE, LTE Advanced, WLAN, and Wimax networks. Furthermore, a common observation receiver may achieve functionality of both TOR and ROR, but may me manufactured with fewer components. This may give rise decreased component costs, decreased PCB (Printed Circuit Board) size, and decreased power consumption.

BRIEF DESCRIPTION OF DRAWINGS

The solution will now be described in more detail by means of exemplary embodiments and with reference to the accompanying drawings, in which.

DETAILED DESCRIPTION

As discussed above, the basic concept of as well the TOR and the ROR is that they comprise local oscillators and A/D-converters arranged to mix the TXRF and RXRF spectrums, respectively. One further problem is also that the local oscillators of the TOR and the ROR may disturb each other. Especially, the LO of the ROR is sensitive to disturbances from the LO of the TOR.

Figure 1:
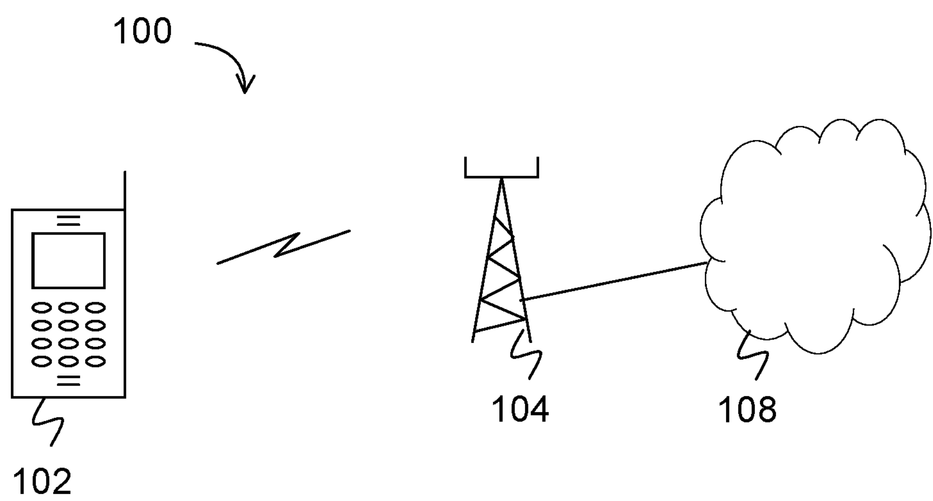
FIG. 1 is a schematic illustration of a communication situation, in accordance with the prior art.
Figure 2:
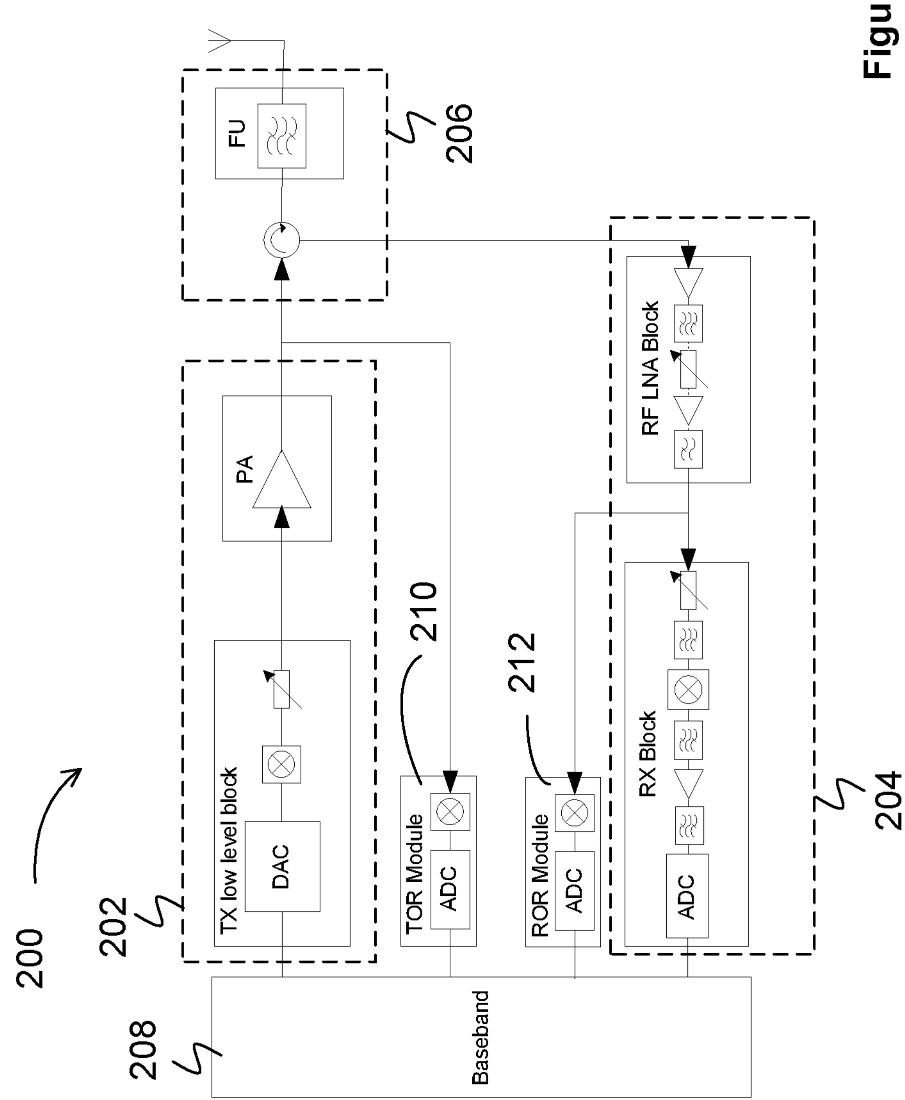
FIG. 2 is a schematic block diagram of a transceiver, in accordance with the prior art.
Figure 3:
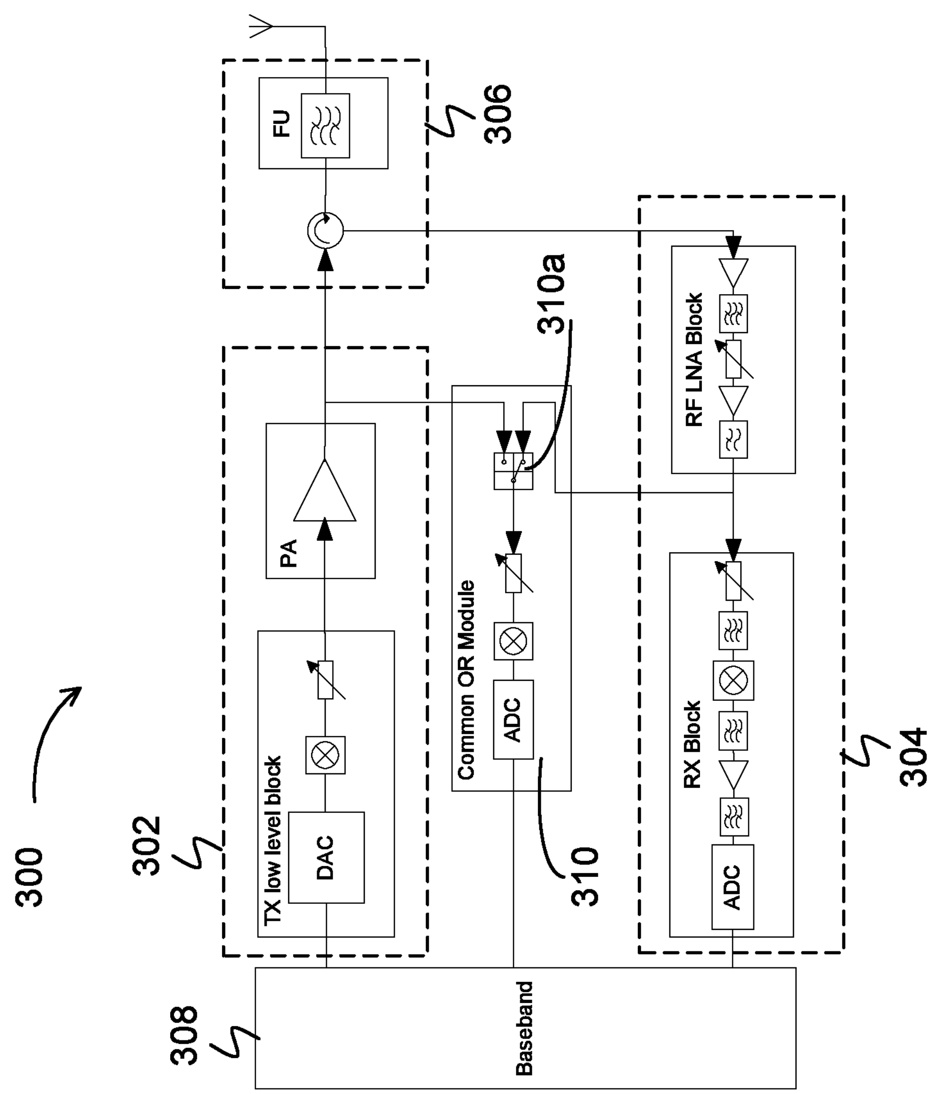
FIG. 3 is a schematic block diagram of a transceiver, according to possible embodiments.

With reference to FIG. 3, which is a schematic overview, a transceiver 300 will now be describe in accordance with one exemplifying embodiment.

The transceiver 300 is a TDD (Time Division Duplex) transceiver and comprises a transmitter 302, a receiver 204, an antenna port 306, and a baseband unit 308. The transmitter 302 is arranged to convert a TX (Transmitter) baseband of the baseband unit 308 into an RXRF signal spectrum. In the transmitter 302, the baseband is subject e.g. to digital-to-analog conversion (DAC), frequency shifting, and amplifying (PA), which result in a RXRF signal spectrum. The antenna port 306 is arranged to emit the TXRF signal spectrum via an antenna. At the antenna port 306, the RXRF signal spectrum is filtered in a band-pass filter of a filter unit (FU).

The receiver 304 is arranged to convert an RXRF signal spectrum which is received from the antenna via the antenna port 306 and convert into an RX baseband signal spectrum. The receiver 304 comprises an LNA (Low Noise Amplifier) and an RX block. The power of the RXRF signal spectrum is low and due to large gain of the LNA the amplified RXRF signal spectrum is typically affected substantial amount of noise.

A COR (Common observation Receiver) 310 is arranged to implement functionality of both TOR (Transmitter Observation Receiver) and ROR (Receiver observation Receiver, i.e. provide feedback of as well the transmitter 302 and the receiver 304 to the baseband unit 308. In short, the COR 310 comprises a mode switch 310*a*, a frequency shifting unit, and an ADC (Analog-Digital Converter). When put into practice the a designer will implement further components, which will be described below in conjunction with another more detailed exemplifying embodiment of the COR. To provide feedback regarding both the transceiver 302 and the receiver 304, the mode switch 310*a* is arranged to alternate which one of the TXRF signal spectrum and the RXRF signal spectrum that is fed into the COR 310. The switching follows a predefined switching scheme between TOR mode and ROR mode, and vice versa. In TDD both the TXRF signal spectrum and the RXRF signal spectrum have the same centre frequency and the switching scheme defines that switching from TXRF to RXRF takes places between UL (Uplink) subframes and DL (Downlink) subframes, and from RXRF to TXRF takes places between DL subframes and UL subframes. The switching in TDD transceivers 300 will be described more detailed below in another embodiment. The switching results in a switched RF signal spectrum wherein the TX part has a high gain but a low dynamic range, and the RX part has a low gain but a high dynamic range. A gain adjustment means is arranged to adjust the gain of the switched RF signal spectrum, and the frequency shifting unit is adapted to frequency shift the switched RF signal spectrum, such that the middle frequency of the switched RF signal spectrum is shifted to zero. Finally, the ADC is arranged to convert the shifted signal spectrum into digital domain and output to the baseband unit 308.

As said, the described embodiment relates to TDD transceivers. However, the principle of FDD (Frequency Division Duplex) is related and will be illustrated.

Figure 4:
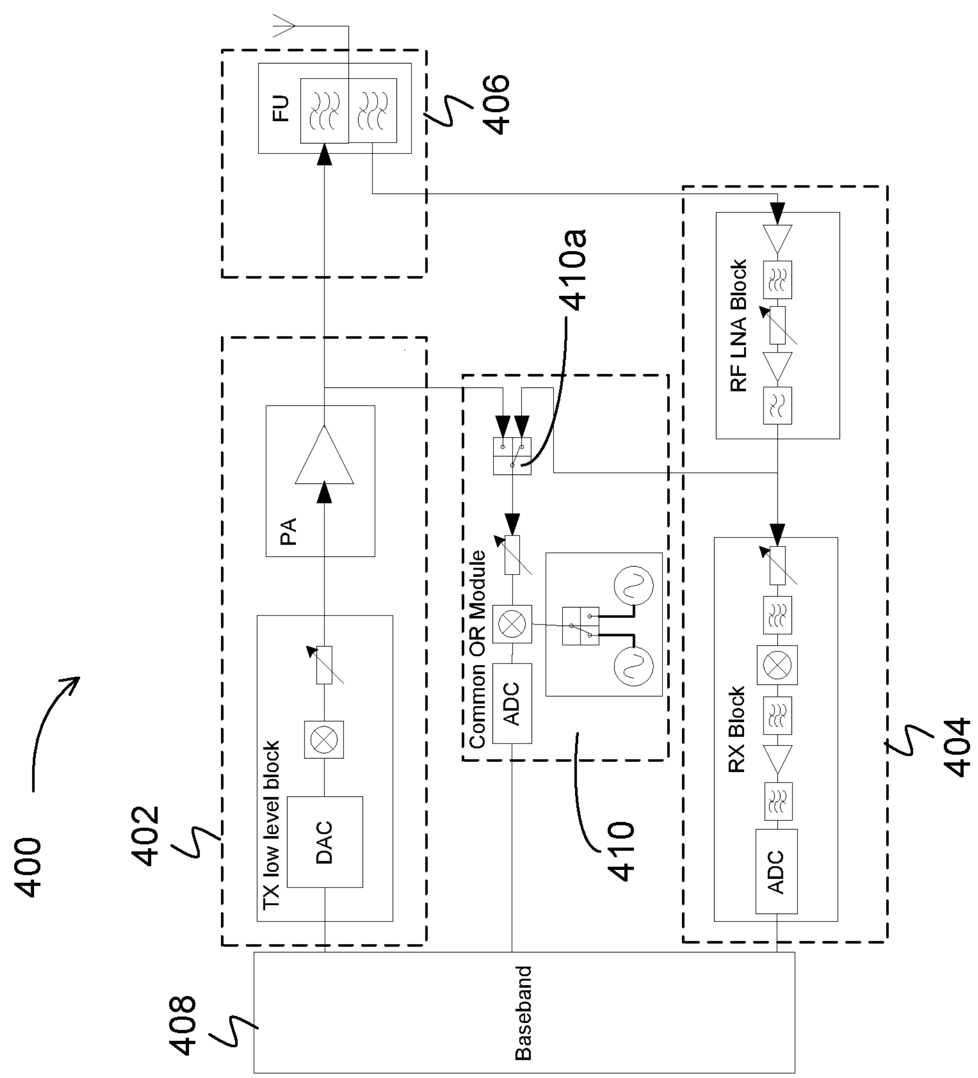
FIG. 4 is a schematic block diagram of a transceiver, according to possible embodiments.

With reference to FIG. 4, which is a schematic overview, a transceiver 400 will now be describe in accordance with one exemplifying embodiment.

The transceiver 400 is an FDD (Frequency Division Duplex) transceiver and comprises a transmitter 402, a receiver 404, an antenna port 406, and a baseband unit 408. The transmitter 302 is arranged to convert a TX (Transmitter) baseband of the baseband unit 408 into an RXRF signal spectrum. In the transmitter 402, the baseband is subject e.g. to digital-to-analog conversion (DAC), frequency shifting, and amplifying (PA), which result in a RXRF signal spectrum. The antenna port 406 is arranged to emit the TXRF signal spectrum via an antenna. At the antenna port 406, the RXRF signal spectrum is filtered in a band-pass filter of a filter unit (FU). Opposite to the TDD transceiver 400 described above, the TXRF signal spectrum and the RXRF signal spectrum of this FDD transceiver are separated in frequency. The antenna port 406 may be equipped with a filtering unit FU which comprises one TXRF band-pass filter and one RXRF band-pass filter, to remove noise.

The receiver 404 is arranged to convert an RXRF signal spectrum which is received from the antenna via the antenna port 306 and convert into an RX baseband signal spectrum. The receiver 404 comprises an LNA (Low Noise Amplifier) and an RX block.

A COR (Common observation Receiver) 410 is arranged to implement functionality of both TOR (Transmitter Observation Receiver) and ROR (Receiver observation Receiver, i.e. provide feedback of as well the transmitter 402 and the receiver 404 to the baseband unit 408. In short, the COR 410 comprises a mode switch 410*a*, a frequency shifting unit, an ADC (Analog-Digital Converter). In addition, when compared with the TDD transceiver 400, the COR 410 comprises two LOs (Local Oscillators) and a further switch (not referred to). The further switch is arranged to provide a TXRF LO output frequency to the frequency shifting unit when the COR 410 is in TOR mode, and an RXRF LO output frequency to the frequency shifting unit when the COR 410 is in ROR mode. When put into practice the a designer will implement further components, which will be described below in conjunction with another more detailed exemplifying embodiment of the COR. To provide feedback regarding both the transceiver 302 and the receiver 304, the mode switch 410*a* is arranged to alternate which one of the TXRF signal spectrum and the RXRF signal spectrum that is fed into the COR 410. The switching of the two switches follows a predefined switching scheme when switching between TOR mode and ROR mode, and vice versa. Due to the fact that the TXRF signal spectrum and the RXRF signal spectrum differ, the switching scheme could be more flexible than in the TDD transceiver. For instance, the mode switching times may be based on on-demand principle, equal time sharing, or any other appropriate time sharing. The switching results in a switched RF signal spectrum wherein the TX part has a high gain but a low dynamic range, and the RX part has a low gain but a high dynamic range. A gain adjustment means is arranged to adjust the gain of the switched RF signal spectrum, and the frequency shifting unit is adapted to frequency shift the switched RF signal spectrum, such that the middle frequencies of the switched RF signal spectrums is frequency shifted into two different bands. The further switch operates simultaneously with the switch 410*a*, to provide the correct LO output frequency to the frequency shifting unit. Finally, the ADC is arranged to convert the two bands into a digital domain as two basebands to be fed to the baseband unit 408.

Figure 5:
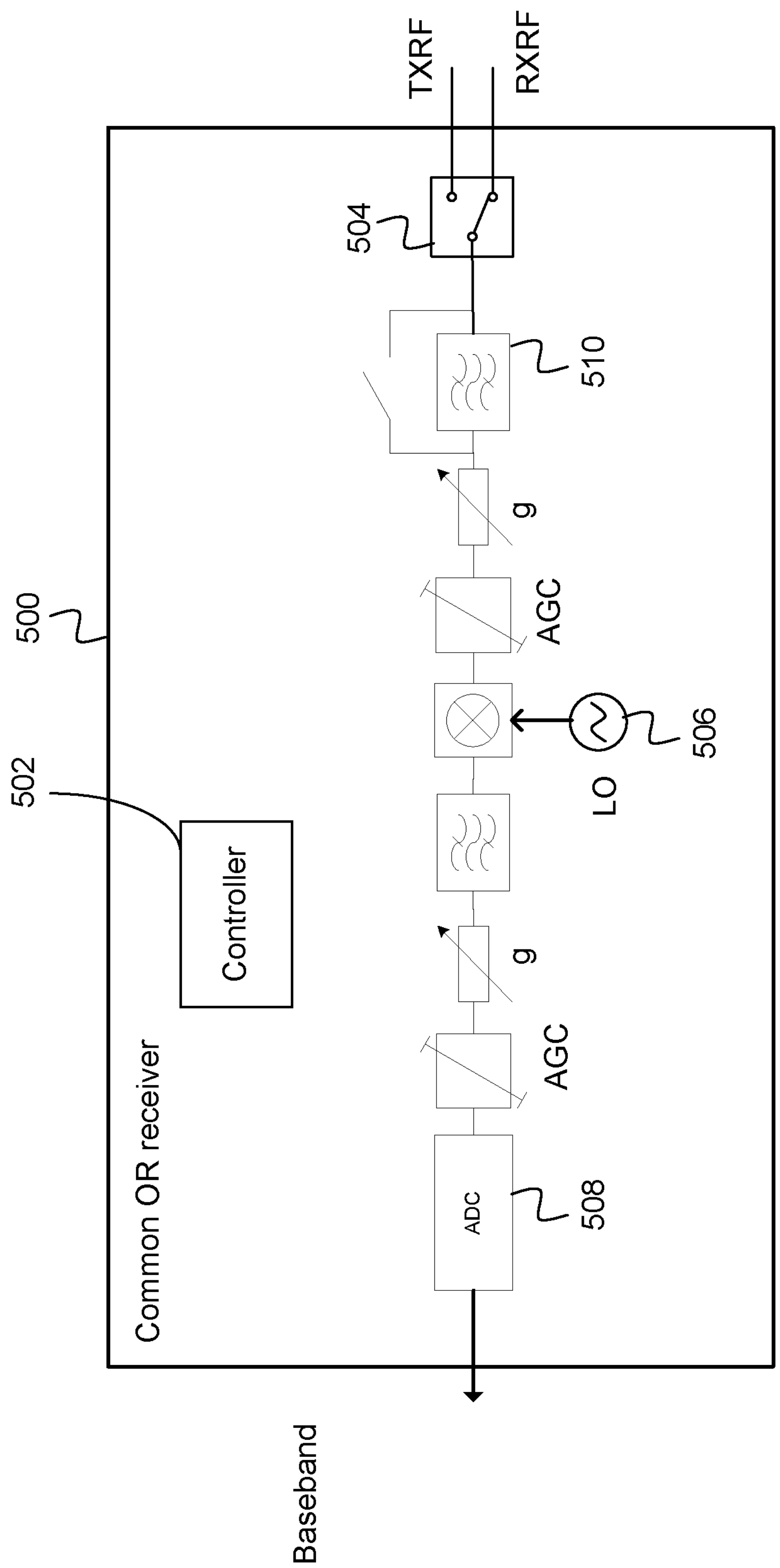
FIG. 5 is a schematic block diagram of an observation transceiver, according to possible embodiments.

With reference to FIG. 5, which is a schematic block diagram, a common observation receiver 500 will now be described in accordance with one exemplifying embodiment.

The common observation receiver is adapted to be placed in a radio transceiver (not shown), and comprises a controller 502, an input unit (504), an LO (local oscillator) 506, and an ADC (Analog-to-digital converter) 508.

The controller 502 is adapted to control the operation of the common observation receiver 500, and is typically implemented as a microprocessor, an ASIC (Application Specific Integrated Circuit), etc. The controller 502 is further adapted to determine a switching scheme, according to which the common observation receiver will operate.

The input unit 504 is adapted to receive a TXRF (Transmitter Radio Frequency) signal spectrum from a transmitter of the radio transceiver, and an RXRF (Receiver Radio Frequency) signal spectrum from a receiver of the radio transceiver. The input unit 504 is in this embodiment implemented as a switch which is controlled by the controller 502. Thereby, the controller is enabled to select whether to observe the transmitter of the receiver, i.e. whether to act in TOR (Transmitter Observation Receiver) mode or in (Receiver Observation Receiver) mode.

Optionally, the common observation receiver may comprise a band-bass filter 510, which could be bypassed in TOR mode. The filter 510 may remove frequencies outside the edges of the RXRF signal spectrum.

The LO 506 is arranged to output an LO output signal to a mixer, such that the mixer will frequency shift the selected one of the TXRF signal spectrum and the RXRF signal spectrum to an IF (Intermediate Frequency) signal spectrum, i.e. a TXRF signal spectrum or an RXIF spectrum.

The ADC 508 is adapted to convert the IF signal spectrums into respective basebands to output to a baseband unit (not shown).

When the transceiver is a TDD transceiver, both the TXRF signal spectrum and the RXRF signal spectrum have the same centre frequency and the mixer is adapted to use the same LO output frequency both in TOR mode and in ROR mode. Furthermore, in TDD, the controller 502 determines the switching scheme, such that the input switches between subframes for UL (Uplink) and DL (Downlink) or vice versa.

When the transceiver is an FDD transceiver, the mixer uses different frequency spectrums for TXRF and RXRF. The LO is then implemented with two outputs, and the controller selects which LO output frequency to use, depending on whether the common observation receiver 500 is in TOR mode or ROR mode.

In an alternative embodiment, which is based on the one described above, the controller 502 is capable to adjust the gains g of the signal spectrums, i.e. the TXRF/RXRF, which is an advantage because the differing gains of the TXRF signal spectrum and the RXRF signal spectrum. In addition, AGC may be applied, which may be beneficial in ROR mode, when the RXRF signal spectrum may have fast variations.

Figure 6:
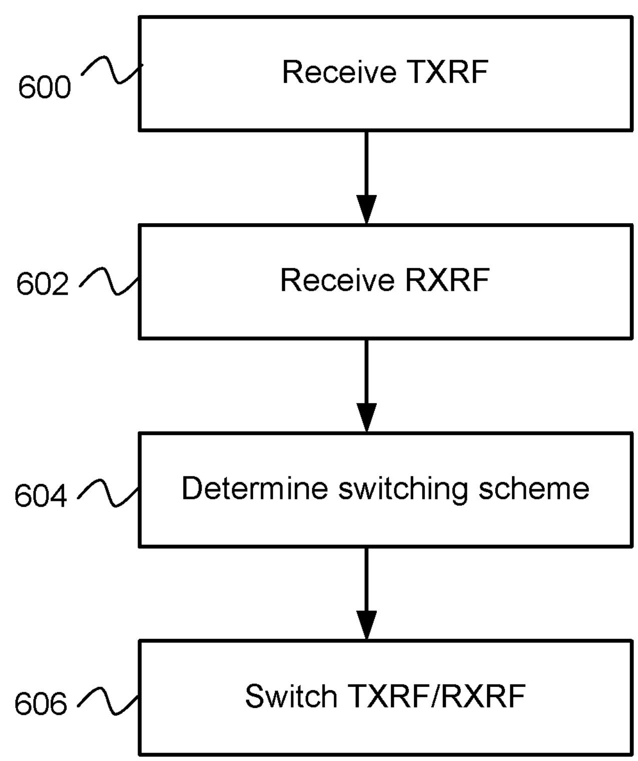
FIG. 6 is a schematic flow chart of a method, according to possible embodiments.

With reference to FIG. 6, which is a schematic block scheme, a method of a common observation receiver will now be described in accordance with one exemplifying embodiment.

The common observation receiver is arranged in a radio transceiver, which comprises a radio transmitter and a radio receiver.

In one action 600, the common observation receiver receives a TXRF signal spectrum of the transmitter. Typically, the TXRF signal is received before being amplified in a power amplifier and fed to an antenna port.

In another action 602, the common observation receiver receives an RXRF signal spectrum of the receiver. Typically, the RXRF signal is received after being amplified in a low noise amplifier.

In another action 604, the common observation receiver determines a switching scheme for a switching between TOR mode and ROR mode, i.e. the switching between the received TXRF signal spectrum and the RXRF signal spectrum, which takes place in a final action 606.

It is to be noted that the defined order of the actions 600, 602 and 604 is not limiting, and that these actions may be performed also in alternative orders. Typically, the reception of TXRF and RXRF, i.e. the actions 600 and 602, are performed at the same time. In addition, the determination of the switching scheme may be performed in advance and the switching scheme may be pre-loaded in the common observation receiver.

Figure 7:
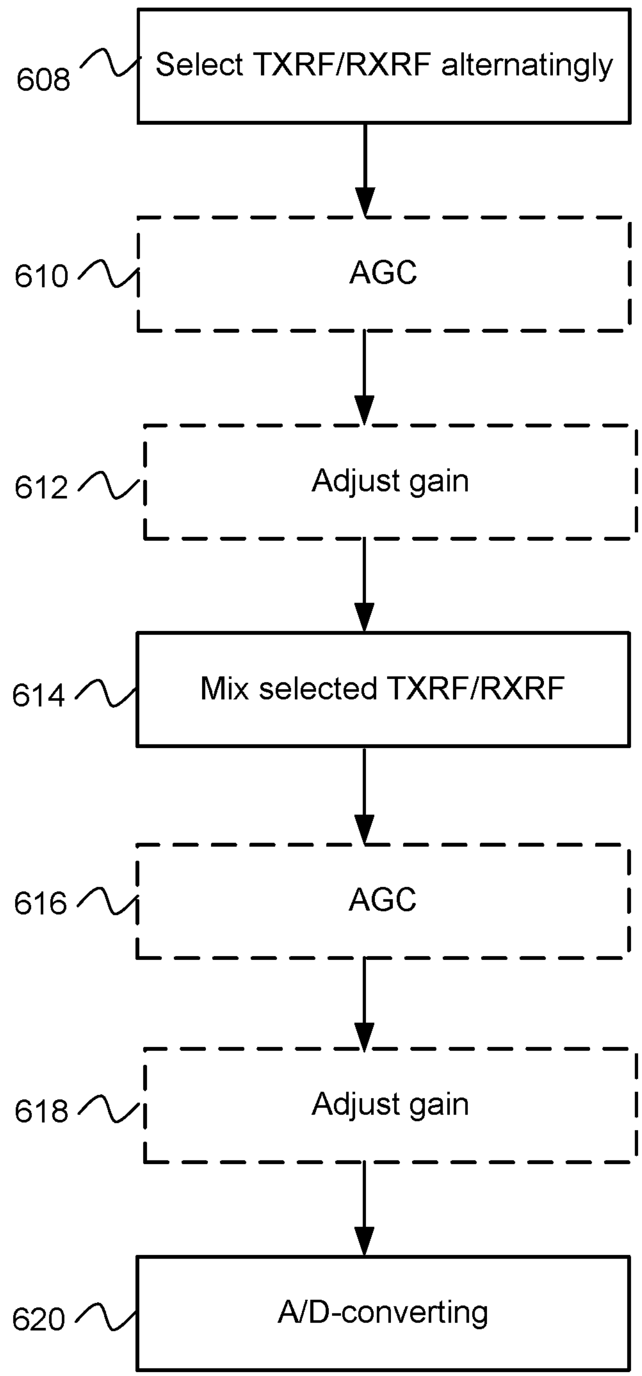
FIG. 7 is a schematic flow chart of a method, according to possible embodiments.

With reference to FIG. 7, which is a schematic block scheme, a method of a common observation receiver will now be described in accordance with one exemplifying embodiment.

This embodiment is related to the above described embodiment, and describes a way to perform the switching of action 606 of the embodiment above.

In an action 608, the received TXRF and RXRF signal spectrums are alternatingly selected. Typically, a switch is arranged which is controlled by a controller. In a following action 612, the gain of the selected one of the TXRF and RXRF signal spectrums may be adjusted. This adjustment is performed due to the variation of the gains of the TXRF and RXRF signal spectrums, and is an optional.

In another following action 614, the selected one of the TXRF and RXRF signal spectrum is mixed with a local oscillator output frequency, which results in a frequency shift of the signal spectrums to a frequency range closer to a baseband. These signal spectrums are referred to as TXIF (Transmitter Intermediate Frequency) and RXIF (Receiver Intermediate Frequency). As described in conjunction with another embodiment the local oscillator frequency depends on whether the transceiver is an FDD transceiver or a TDD transceiver. For FDD, a further local oscillator frequency will be applied.

In a following action 618, the gain may be adjusted for the TXIF signal spectrum and the RXIF spectrum. The action 618 is also optional.

In a final action 620, the TXIF signal spectrum and the RXIF signal spectrum are analog-to-digital converted into respective basebands to be fed to a baseband unit.

The method has been schematically described, and may comprise further actions. For instance, AGC (Automatic Gain Control) may be performed in intermediate actions 610 and 616 to control gain adjustments It is to be noted that the transceivers of the described exemplifying embodiments are described in a non-limiting manner. However, a designer may select to implement further units and functionality in the receivers within the described concept, such as various averaging units or analyse units which could perform statistic analysis of the signal spectrums. Moreover, the figures and embodiments illustrate a plurality of functional units in a non-limiting manner.

However, a physical implementation of the proposed common observation receivers may be performed alternatively within the disclosed concept. For instance, functionality of a specific illustrated unit may be implemented in another suitable unit when put into practice.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a common observation receiver for enabling observation of a transmitter and a receiver, the method comprising:

receiving, by the common observation receiver, a Transmitter Radio Frequency (TXRF) signal spectrum from the transmitter to enable observation of the transmitter;

receiving, by the common observation receiver, a Receiver Radio Frequency (RXRF) signal spectrum from the receiver to enable observation of the receiver;

determining, by the common observation receiver, a switching scheme based on whether the type of the transmitter and the receiver is Frequency Division Duplex (FDD) or Time Division Duplex (TDD); and switching, by the common observation receiver based on the switching scheme, the TXRF signal spectrum and the RXRF signal spectrum into a switched baseband signal spectrum.

2. The method according to claim 1, wherein switching comprises:

alternatingly selecting one of the TXRF signal spectrum and the RXRF signal spectrum;

mixing the selected one of the TXRF signal spectrum and the RXRF spectrum with a local oscillator (LO) output signal, resulting in a switched Intermediate Frequency (IF) signal spectrum; and analog-to-digital converting the switched IF signal spectrum into the switched baseband signal spectrum.

3. The method according to claim 2, further comprising filtering the RXRF signal spectrum with a band-pass filter, and performing Automatic Gain Control (AGC) to adjust a gain of the selected one of the RXRF signal spectrum and the TXRF signal spectrum, wherein the gain is adjusted based on the selected one of the RXRF signal spectrum and the TXRF signal spectrum, such that a transmitter gain $g_{TOR}$ is applied for the TXRF signal spectrum and a receiver gain $g_{ROR}$ is applied for the RXRF signal spectrum.

4. The method according to claim 1, wherein the common observation receiver is a Time Division Duplex (TDD) common observation receiver, and a local oscillator (LO) output signal is applied both when mixing the TXRF signal spectrum, and when mixing the RXRF signal spectrum.

5. The method according to claim 4, wherein the TXRF signal spectrum comprises Downlink (DL) data and the RXRF signal spectrum comprises Uplink (UL) data, and the switching of the TXRF signal spectrum and the RXRF signal spectrum is performed according to the switching scheme, the switching scheme defining that a switch from UL data to DL data will be completed before a DL subframe starts, or that a switch from UL data to DL data will be initiated after a UL subframe ends.

6. The method according to claim 4, wherein the TXRF signal spectrum comprises Downlink (DL) data and the RXRF signal spectrum comprises Uplink (UL) data, and the switching of the TXRF signal spectrum and the RXRF signal spectrum is performed according to the switching scheme, the switching scheme defining that a switch from DL data to UL data will be performed within a guard period between a DL subframe and a UL subframe.

7. The method according to claim 1, wherein the common observation receiver is a Frequency Division Duplex (FDD) common observation receiver, and a first local oscillator (LO) output signal is applied when mixing the TXRF signal spectrum, and a second local oscillator (LO) output signal is applied when mixing the RXRF signal spectrum.

8. A common observation receiver for enabling monitoring of a transmitter and a receiver, the common observation receiver comprising:

an input adapted to receive a Transmitter Radio Frequency (TXRF) signal spectrum from the transmitter to enable observation of the transmitter and a Receiver Radio Frequency (RXRF) signal spectrum from the receiver to enable observation of the receiver; and a controller adapted to determine a switching scheme based on whether the type of the transmitter and the receiver is Frequency Division Duplex (FDD) or Time Division Duplex (TDD); and the controller further adapted to alternatingly switch based on the switching scheme the TXRF signal spectrum and the RXRF signal spectrum into a switched baseband signal spectrum.

9. The common observation receiver according to claim 8, further comprising an analog-to-digital converter (ADC) and a local oscillator (LO) wherein the controller is adapted to perform the alternatingly switch by:

alternatingly selecting one of the TXRF signal spectrum and the RXRF signal spectrum;

mixing the selected one of the TXRF signal spectrum and the RXRF spectrum with a local oscillator (LO) output signal, resulting in a switched Intermediate Frequency (IF) signal spectrum; and controlling the ADC to analog-to-digital converting the switched IF signal spectrum into the switched baseband signal spectrum.

10. The common observation receiver according to claim 9, wherein the controller is further adapted to filter the RXRF signal spectrum, and perform Automatic Gain Control (AGC) to adjust a gain of the selected one of the RXRF signal spectrum and the TXRF signal spectrum, wherein the gain is adjusted based on the selected one of the RXRF signal spectrum and the TXRF signal spectrum, such that a transmitter gain $g_{TOR}$ is applied for the TXRF signal spectrum and a receiver gain $g_{ROR}$ is applied for the RXRF signal spectrum.

11. The common observation receiver according to claim 8, wherein the common observation receiver is implemented as a Time Division Duplex (TDD) common observation receiver, wherein the TDD common observation receiver is further adapted to apply local oscillator (LO) output signal both when mixing the TXRF signal spectrum, and when mixing the RXRF signal spectrum.

12. The common observation receiver according to claim 11, wherein the TXRF signal spectrum comprises Downlink (DL) data and the RXRF signal spectrum comprises Uplink (UL) data, and the controller is further adapted to perform the switching of the TXRF signal spectrum and the RXRF signal spectrum according to the switching scheme, wherein the switching scheme defines that a switch from UL data to DL data will be completed before a DL subframe starts, or that a switch from UL data to DL data will be initiated after a UL subframe ends.

13. The common observation receiver according to claim 11, wherein the TXRF signal spectrum comprises Downlink (DL) data and the RXRF signal spectrum comprises Uplink (UL) data, and the controller is further adapted to perform the switching of the TXRF signal spectrum and the RXRF signal spectrum according to the switching scheme, wherein the switching scheme defines that a switch from DL data to UL data will be performed within a guard period between a DL subframe and a UL subframe.

14. The common observation receiver according to claim 8, wherein the common observation receiver is implemented as a Frequency Division Duplex (FDD) common observation receiver, wherein the FDD common observation receiver is further adapted to apply a first local oscillation (LO) output signal when mixing the TXRF signal spectrum, and a second local oscillation (LO) output signal when mixing the RXRF signal spectrum.

15. A communication network node comprising the common observation receiver according to claim 8.

16. A User Equipment (UE) comprising the common observation receiver according to claim 8.

17. A transceiver comprising:

a receiver;

a transmitter;

an antenna port;

a baseband unit; and a common observation receiver configured to monitor the transmitter and the receiver and provide feedback of the transmitter and the receiver to the baseband unit, the common observation receiver comprising:

a controller;

a switch configured to receive a Transmitter Radio Frequency (TXRF) signal spectrum from the transmitter to enable observation of the transmitter, and to receive a Receiver Radio Frequency (RXRF) signal spectrum from the receiver to enable observation of the receiver;

the controller configured to control the switch to output the TXRF signal spectrum when in a transmitter observation receiver mode, and to output the RXRF signal spectrum when in a receiver observation receiver mode;

a mixer;

a local oscillator (LO) unit configured to output at least one LO output signal to the mixer wherein the mixer is configured to use the at least one LO output signal to frequency shift the TXRF signal spectrum or the RXRF signal spectrum whichever is output from the switch to an intermediate frequency (IF) TXRF signal spectrum or an intermediate frequency (IF) RXRF signal spectrum; and an analog-to-digital converter (ADC) configured to convert the IF TXRF signal spectrum or the IF RXRF signal spectrum into a baseband TXRF signal spectrum or a baseband RXRF signal spectrum and then output the baseband TXRF signal spectrum or the baseband RXRF signal spectrum to the baseband unit.

18. The transceiver of claim 17, wherein the mixer is configured to use one LO output signal to frequency shift the TXRF signal spectrum or the RXRF signal spectrum when the transceiver is a Time Division Duplex (TDD) transceiver.

19. The transceiver of claim 17, wherein the mixer is configured to use one LO output signal to frequency shift the TXRF signal spectrum or use another LO output signal to frequency shift the RXRF signal spectrum when the transceiver is a Frequency Division Duplex (FDD) transceiver.

20. The transceiver of claim 17, wherein:

the common observation receiver obtains the TXRF signal spectrum which comprises Downlink (DL) data from an output of a power amplifier in the transmitter; and the common observation receiver obtains the RXRF signal spectrum which comprises Uplink (UL) data from an output of Radio Frequency (RF) Low Noise Amplifier (LNA) block of the receiver.

* * * * *